(12) United States Patent
Li et al.

(10) Patent No.: US 9,381,563 B2
(45) Date of Patent: Jul. 5, 2016

(54) METHOD FOR JOINING WORKPIECES

(71) Applicant: GM GLOBAL TECHNOLOGY OPERATIONS LLC, Detroit, MI (US)

(72) Inventors: Yongqiang Li, Rochester, MI (US); Blair E. Carlson, Ann Arbor, MI (US); Jorge F. Arinez, Rochester Hills, MI (US); Saul S. Lee, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 14/454,245

(22) Filed: Aug. 7, 2014

(65) Prior Publication Data

US 2016/0038993 A1 Feb. 11, 2016

(51) Int. Cl.
*B21J 15/08* (2006.01)
*B21J 15/14* (2006.01)
*B21J 15/02* (2006.01)
*B21J 15/12* (2006.01)
*F16B 25/00* (2006.01)
*F16B 33/02* (2006.01)

(52) U.S. Cl.
CPC .............. *B21J 15/147* (2013.01); *B21J 15/025* (2013.01); *B21J 15/027* (2013.01); *B21J 15/12* (2013.01); *F16B 25/0052* (2013.01); *F16B 33/02* (2013.01); *Y10T 29/49943* (2015.01); *Y10T 29/49956* (2015.01)

(58) Field of Classification Search
CPC .................. Y10T 29/49837; Y10T 29/49835; Y10T 29/49954; Y10T 29/49963; Y10T 29/49959; Y10T 29/49943; Y10T 29/49956; F16B 33/02; F16B 25/0052; B21J 15/025; B21J 15/147; B21J 15/027

USPC ............ 411/416, 417, 418; 29/524.1, 525.06, 29/525.11
See application file for complete search history.

(56) References Cited

U.S. PATENT DOCUMENTS

| 5,153,978 | A | * | 10/1992 | Simmons | ............ B29C 65/0681 29/509 |
| 5,361,483 | A | | 11/1994 | Rainville et al. | |
| 5,390,407 | A | | 2/1995 | Musil | |
| 7,996,975 | B1 | | 8/2011 | Denslow | |
| 2003/0135974 | A1 | * | 7/2003 | Stevenson | .............. B21J 15/027 29/456 |
| 2005/0178816 | A1 | * | 8/2005 | Stevenson | .............. B21J 15/027 228/112.1 |

FOREIGN PATENT DOCUMENTS

DE 19800038 A1 7/1999

\* cited by examiner

*Primary Examiner* — Jermie Cozart
(74) *Attorney, Agent, or Firm* — Quinn Law Group, PLLC

(57) ABSTRACT

A method can be used for joining workpieces using a fastener. The fastener includes a first head and a shank extending from the first head along a fastener axis. The joining method includes the following steps: (a) rotating a fastener about a fastener axis; (b) moving the fastener toward the first and second workpieces while the fastener rotates about the fastener axis such that the fastener increases the temperature in the first and second workpieces in order to soften and pierce the first and second workpieces along the fastener axis; and (c) advancing the fastener through the first and second workpieces and toward an open cavity of a die after piercing the first and second workpieces while the fastener rotates about the fastener axis such that the shank is partially disposed inside the open cavity in order to form a second head.

18 Claims, 3 Drawing Sheets

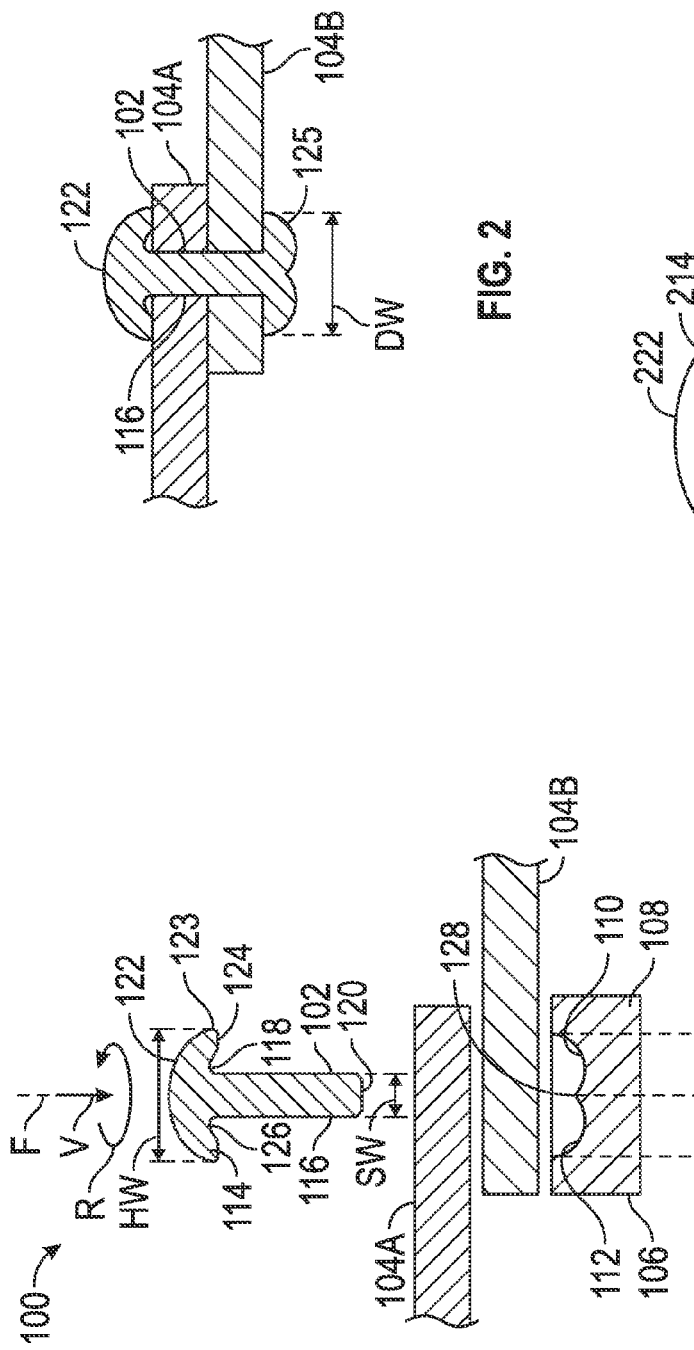

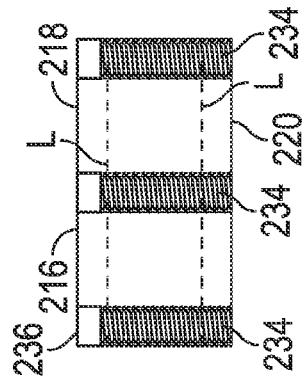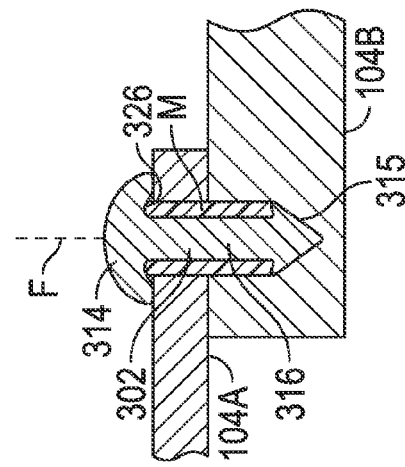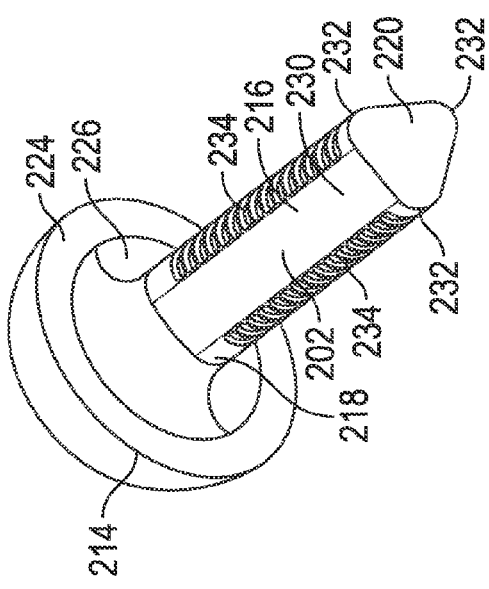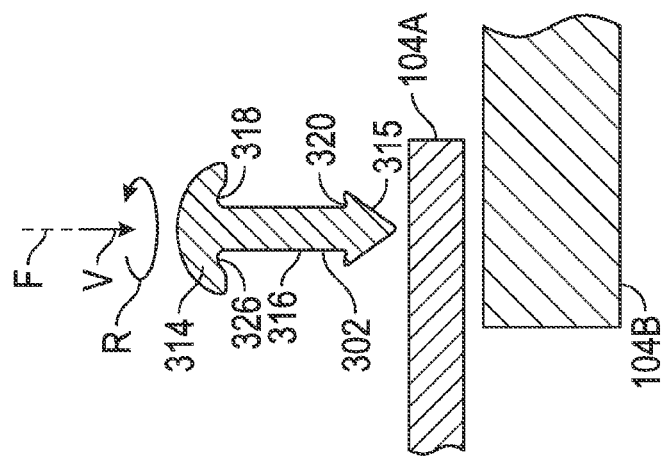

METHOD FOR JOINING WORKPIECES

TECHNICAL FIELD

The present disclosure relates to a method of joining at least two workpieces.

BACKGROUND

During a manufacturing process, workpieces sometimes need to be joined together. For example, in vehicle manufacturing, numerous workpieces have to be joined together in order to assemble the vehicle body as well as other parts of the vehicle. Workpieces can be joined together using several procedures. For example, adhesives can be placed between workpieces to join them. Alternatively, welding can be used to join workpieces together.

SUMMARY

A fastener can be used to couple workpieces together. In order to maintain the structural integrity of the fastener, it is useful to minimize corrosion in the fastener. To this end, a polymeric fastener can be used to join workpieces together. For example, at least two workpieces, such as a carbon-fiber reinforced thermoplastic polymer (CFRTP) sheets, can be joined with a polymeric fastener by employing the method described below.

The presently disclosed joining method entails rotating a fastener about a fastener axis. The fastener may be wholly or partly made of a polymeric material and includes a first head and a shank extending from the first head along the fastener axis. Irrespective of the specific materials employed, the softening temperature of the material forming the fastener is greater than the softening temperatures of the materials forming the first and second workpieces. As used herein, the term "softening temperature" means the temperature at which a material softens. The joining method further includes moving the fastener toward the first and second workpieces while the fastener rotates about the fastener axis. As the fastener rotates and advances through the first and second workpieces, it generates friction in the workpieces, causing a temperature increase in the first and second workpieces. This temperature increase is sufficient to soften the workpieces, thereby allowing the fastener to pierce the workpieces as it moves linearly. The fastener is continuously advanced through the first and second workpieces and toward an open cavity of a die after piercing the first and second workpieces while the fastener continues to rotate about the fastener axis. Due to its linear advancement toward the die, the shank of the fastener is eventually partially disposed in the open cavity of the die. The rotation and linear movement of the fastener causes the shank to frictionally engage the die. As a result, the temperature in the shank increases, thereby softening the shank. Therefore, a portion of the shank acquires the shape of the open cavity of the die and forms a second head. The second head (along with the first head) of the fastener can clamp the first and second workpieces.

In another embodiment, the first and second workpieces can be joined using another fastener. This fastener is made of a polymer and includes a head and a shank extending from the head along a fastener axis. The shank defines a first shank end and a second shank end opposite the first shank end. The head is coupled to the shank at the first shank end. Further, the fastener includes an anchor coupled to the shank at the second shank end. The anchor has a substantially tapered shape. The joining method includes the following steps: (a) rotating a fastener about a fastener axis; (b) advancing the fastener through the first workpiece and into the second workpiece while the fastener rotates about the fastener axis such that the fastener increases the temperature in the first and second workpieces in order to soften and pierce the first and second workpieces; and (c) continuing rotating and advancing the fastener toward the second workpiece along the fastener axis until the anchor is at least partially disposed inside the second workpiece but before the anchor passes completely through the second workpiece.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, exploded cross-sectional side view of a joining assembly including a fastener, two workpieces, and a die, wherein the fastener is shown outside the workpieces;

FIG. 2 is a schematic, cross-sectional side view of the joining assembly of FIG. 1, wherein the fastener is coupling the two workpieces;

FIG. 3 is a schematic, cross-sectional side view of a die of the joining assembly in accordance with another embodiment of the present disclosure;

FIG. 4 is a schematic, cross-sectional side view of a die of the joining assembly in accordance with yet another embodiment of the present disclosure;

FIG. 5 is a schematic, front view of a fastener of the joining assembly in accordance with another embodiment of the present disclosure;

FIG. 6 is a schematic, cross-sectional top view of the fastener shown in FIG. 5;

FIG. 7 is a schematic, perspective view of the fastener shown in FIG. 5;

FIG. 8 is a schematic, unwrapped view of the shank of the fastener shown in FIG. 7;

FIG. 9 is a schematic, exploded cross-sectional side view of a joining assembly in accordance with another embodiment of the present disclosure, wherein the fastener includes an anchor outside the workpieces;

FIG. 10 is a schematic, cross-sectional side view of the joining assembly of FIG. 9, wherein the fastener is coupling the two workpieces;

DETAILED DESCRIPTION

Figure 12:
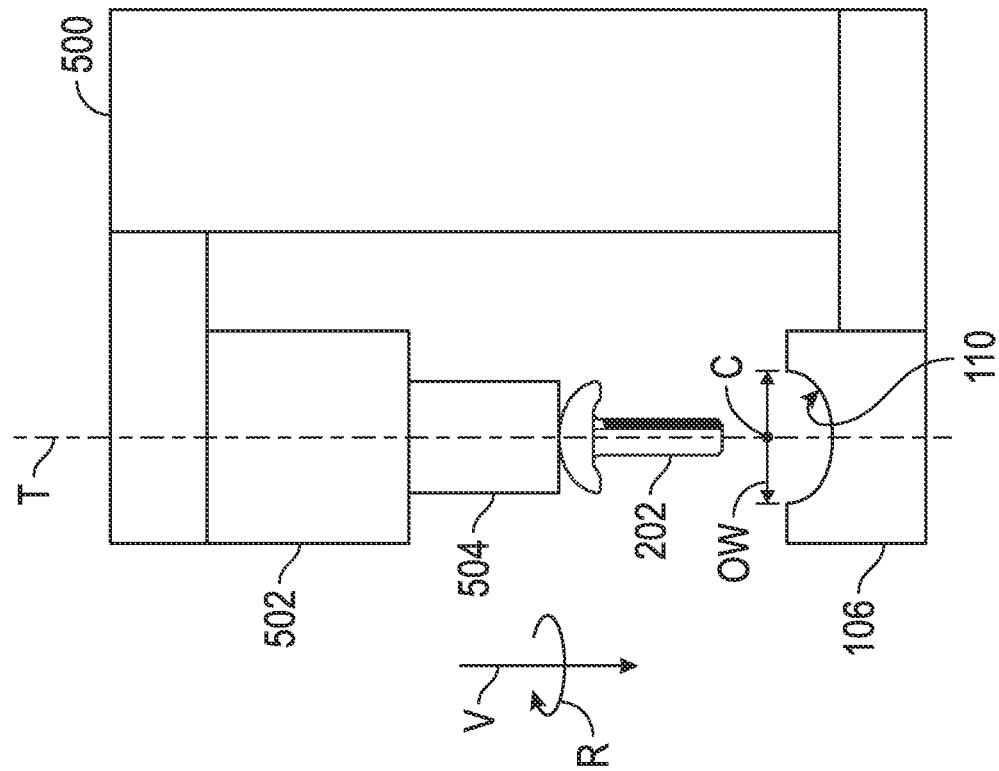
FIG. 12 is a schematic, front view of a tool assembly holding a fastener.

Referring to the drawings, wherein like reference numbers correspond to like or similar components throughout the several figures, and beginning with FIGS. 1 and 2, a joining assembly 100 can be used to join at least two workpieces 104A, 104B or other suitable components. The joining assembly 100 includes a fastener 102, a first workpiece 104A, a second workpiece 104B, and a die 106. The fastener 102 may be wholly or partly made of a polymeric material, such as a carbon-fiber reinforced thermoplastic polymer (CFRTP), in order to minimize corrosion. Accordingly, the fastener 102 may be referred to as a polymeric fastener. As a non-limiting example, the fastener 102 may be wholly or partly made of ultra-high-molecular-weight polyethylene (UHMWPE), polyether ether ketone (PEEK), or any other suitable polymer. Alternatively, the fastener 102 may be wholly or partly made of a metallic material, such as an aluminum alloy.

Irrespective of the specific material employed, the fastener 102 includes a head 114 and a shank 116 coupled to the head 114. In the present disclosure, the head 114 is referred to as the first head because the fastener 102 eventually includes another head as discussed in detail below. Moreover, the head 114 has a width (i.e., the head width HW) and defines a first or top head surface 122 and a second or bottom head surface 124 opposite the first head surface 122. The first head surface 122 may have a substantially flat shape or a dome shaped as shown. In addition, the first head 114 includes at least one side surface 123 interconnecting the first head surface 122 and the second head surface 124. The first head surface 122 may have a substantially convex shape in order to facilitate clamping the first and second workpieces 104A, 104B. The fastener 102 defines a head cavity 126 extending along the second head surface 124. The head cavity 126 is configured, shaped, and sized to receive softened material from the first and second workpieces 104A, 104B and may have an annular shape. Further, the head cavity 126 may be arranged around the shank 116.

The shank 116 is coupled to the head 114 at the second head surface 124 and extends along a fastener axis F. Further, the shank 116 defines a first shank end 118 and a second shank end 120 opposite the first shank end 118. The head 114 is coupled to the shank 116 at the first shank end 118. The shank 116 has a width (i.e., the shank width SW) that is less than the head width HW.

The first and second workpieces 104A, 104B may be configured as sheets and may have a substantially planar shape. However, it is contemplated that the first and second workpieces 104A, 104B may have other suitable shapes. The first and second workpieces 104A, 104B may be made of the same or different materials. In one embodiment, each of the first and second workpieces 104A, 104B are wholly or partly made of CFRTP. It is envisioned, however, that the first and second workpieces 104A, 104B may be entirely or partially made of other materials, such as other polymeric materials (e.g., a thermoset) or a metallic material (e.g., an magnesium alloy). Regardless of the specific materials employed, the softening temperature or point of the materials forming the first and second workpieces 104A, 104B is less than the softening temperature of the material forming the fastener 102. As used herein, the term "softening temperature" means the temperature at which a material softens. The softening temperature can be determined, for example, using the Vicat method.

In the present disclosure, the material forming the fastener 102 is referred to as the first material. The material forming the first workpiece 104A is referred to as the second material. The material forming the second workpiece 104B is referred to as the third material. Furthermore, the softening temperature of the first material is referred to as the first softening temperature. The softening temperature of the second material is referred to as the second softening temperature, and the softening temperature of the third material is referred to as the third softening temperature. In the joining assembly 100, the first softening temperature (i.e., the softening temperature of the fastener 102) is greater than the second softening temperature (i.e., the softening temperature of the first workpiece 104A) and the third softening temperature (i.e., the softening temperature of the second workpiece 104B) in order to allow the fastener 102 to pierce the first workpiece 104A and the second workpiece 104B as discussed in detail below. The second and third softening temperatures (i.e., the softening temperature of the first and second workpieces 104A, 104B) may be equal or different. The second and third materials (i.e., the materials forming the first and second workpieces 104A, 104B) may have a melting or softening temperature ranging between fifty (50) degrees Celsius and three hundred and thirty (330) degrees Celsius. As a non-limiting example, the melting or softening temperature of the first and second materials may be about two hundred (200) degrees Celsius.

The joining assembly 100 further includes a die 106 made of a substantially rigid material, such as a metal. In the present disclosure, the material forming the die 106 is referred to as a fourth material and this material has a melting temperature that is greater than four hundred (400) degrees Celsius. The die 106 is wholly or partly made of a material having a softening temperature that is significantly higher than the softening temperature of the materials forming the fastener 102, the first workpiece 104, and the second workpiece 104B. The die 106 includes a die body 108 and defines an open cavity 110 extending into the die body 108. The die body 108 has an inner die surface 112 defining the open cavity 110. The open cavity 110 is configured, shaped, and sized to reform the second end 120 of the shank 116 into a second head 125 as the shank 116 is pressed into the open cavity 110 at predetermined rotational and linear translational speeds as discussed in detail below. In the depicted embodiment, the open cavity 110 has a cavity width OW. The cavity width OW is larger than the shank width SW in order to allow the shank 116 to be received by the open cavity 110. The die 106 may further include a protrusion 128 extending from the die body 108. The protrusion 128 may have a substantially tapered or pointed shape and is located at the center C of the open cavity 110. The center C of the open cavity 110 is in the middle of the cavity width OW. In the joining assembly 100, the fastener axis F is substantially aligned with (and intersects) the center C of the open cavity 110.

With reference to FIG. 1, the present disclosure relates to a method for joining at least two workpieces (i.e., the first and second workpieces 104A, 104B) using the fastener 102. As discussed above, the first and second workpieces 104A, 104B may be CFRTP sheets. First, the first workpiece 104A is moved relative to the second workpiece 104B in order to position the first workpiece 104A at least partially over the second workpiece 104B as shown in FIG. 1. Further, the first and second workpieces 104A, 104B are moved toward the die 106 in order to position them at least partially over the die 106 while the first workpiece 104A remains at least partially disposed over the second workpiece 104B as shown in FIG. 1. The fastener 102 is moved toward the first and second workpieces 104A, 104B in order to position it over the die 106, the first workpiece 104A, and the second workpiece 104B as shown in FIG. 1. At this juncture, the fastener axis F, which extends along the shank 116, should intersect the first workpiece 104A, the second workpiece 104B, the center C of the open cavity 110, and the protrusion 128.

After positioning the fastener 102 over the first and second workpieces 104A, 104B, the fastener 102 is rotated about the fastener axis F in the direction indicated by arrow R. Although FIG. 1 shows a particular rotational direction R, it is envisioned that the fastener 102 can be rotated about the fastener axis F in the opposite rotational direction. A motor or any suitable actuator can be used to rotate the fastener 102 about the fasteners axis F. In one embodiment, the fastener 102 is rotated at three thousand (3,000) revolutions per minute (RPMs) in order to allow the fastener 102 to penetrate the first and second workpieces 104A, 104B as discussed in detail below. The fastener 102 is also moved linearly along the fastener axis F toward the first and second workpieces 104A, 104B while the fastener 102 rotates about the fastener axis F. Specifically, the fastener 102 is advanced in the direction indicated by arrow V toward the first workpiece 104A and the second workpiece 104B. As a non-limiting example, the fastener 102 can be moved linearly at sixty (60) millimeters (mm) per minute in order to pierce the first and second workpieces 104A, 104A. The rotation and linear movement of the fastener 102 can be commenced simultaneously or sequentially.

The fastener 102 is continuously advanced and rotated through the first and second workpieces 104A, 104B. Due to its rotation and linear movement through the first and second workpieces 104A, 104B, the fastener 102 increases the temperature of the first and second workpieces 104A, 104B, thereby softening (or even melting) the material of the first and second workpieces 104A, 104B disposed along the fastener axis F. Accordingly, the rotation and translation of the fastener 102 increases the temperature of the first and second workpieces 104A, 104B at least beyond the softening temperature of the materials forming first and second workpieces 104A, 104B. Through its continued linear advancement and rotation, the fastener 102 pierces the first and second workpieces 104A, 104B along the fastener axis F. However, it is contemplated that holes can be preformed (e.g., predrilled) in the first and second workpieces 104A, 104B before moving the fastener 102 through the first and second workpieces 104A, 104B. For example, if the first and second workpieces 104A, 104B are wholly or partly made of a metal or a thermosetting composite, it may be useful to predrilled holes in the first and second workpieces 104A, 104B before moving the fastener 102 through the first and second workpieces 104A, 104B. Irrespective of the specific materials employed, the softening temperature of the material forming the fastener 102 is greater than the softening temperatures of the materials forming the first and second workpieces 104A, 104B in order to allow the fastener 102 to retain its rigidity while it rotates and passes through the first and second workpieces 104A, 104B without predrilled holes. Moreover, the melting temperature of the material forming the fastener 102 is greater than the melting temperature of the materials forming the first and second workpieces 104A, 104B in order to allow the fastener 102 to pass through the first and second workpieces 104A, 104B without substantially losing its geometrical dimensions. As a non-limiting example, the softening temperature of the materials forming the first and second workpieces 104A, 104B may range between fifty (50) degrees Celsius and three hundred and thirty (330) degrees Celsius, and the softening temperature of the material forming the fastener 102 may range between two hundred (200) and three hundred and seventy five (375) degrees Celsius.

After piercing the first and second workpieces 104A, 104B, the fastener 102 is continuously advanced linearly toward the die 106 while the fastener 102 rotates about the fastener axis F. Specifically, the fastener 102 is moved linearly toward the open cavity 110 in order to position part of the shank 116 inside the open cavity 110. In the embodiment depicted in FIG. 1, the fastener 102 is moved toward the open cavity 110 so that the second shank end 120 contacts and frictionally engages the protrusion 128. The stress concentration in the second shank end 120 caused by the pointed shaped of the protrusion 128 helps the die 106 form the second head 125. Thus, because the shank 116 is partially disposed in the open cavity 110 while the fastener 102 rotates and forcibly moves toward the die 106, a portion of the shank 116 softens and acquires the shape of the open cavity 110 in order to form the second head 125. Because the friction between the die 106 and the shank 116 aids in forming the second head 125, the die 106 is referred to as the friction forming die. The temperature of the shank 116 (especially portions around the second shank end 120) increases while the fastener 102 is rotated and advanced into the open cavity 110. At this juncture, the temperature of part of the shank 116 increases beyond the softening temperature of the material forming the fastener 102 in order to allow the second shank end 120 to soften and acquire the shape of the open cavity 110. However, the die 106 does not soften or melt while friction is generated between the shank 116 and the inner die surface 112. To prevent the die 106 from melting (or softening) while the fastener 102 is applying force to the inner die surface 112, the melting temperature of the material forming the die 106 may be, for example, greater than four hundred (400) degrees Celsius. It is also desirable to make the die 106 of a substantially rigid material in order to minimize wearing after extensive use.

With reference to FIG. 2, the second head 125 has a width DW that is equal or substantially equal to the cavity width OW of the open cavity 110. Accordingly, the width DW of the second head 125 is greater than the width SW of the shank 116. The shape and size of the first head 114 and the second head 125 of the fastener 102 help clamp the first and second workpieces 104A, 104B. In particular, the second head 125 may have a substantially convex shape to render a desirable load carrying capacity for the fastened joint between the first and second workpieces 104A, 104B. To form this convex shape, the open cavity 110 (FIG. 1) has a substantially concave shape, except for its center, which has the protrusion 128. However, the open cavity 110 may have other suitable shapes. For instance, instead of the protrusion 128, the open cavity 110 may define a slot 111 extending into die body 108 along the center C of the open cavity 110 as shown in FIG. 3. The inner wall 113 defining the slot 111 may be substantially parallel to or at a small nonzero angle with the fastener axis F as indicated to facilitate the disengagement of the die 106 and the second head 125 upon completion of joining. The slot 111 is in communication with the open cavity 110 and can be incorporated into the die 106 when relatively less material (in comparison with the prior embodiment) has to be softened (or even melted) in order to form the second head 125. Alternatively, the die 106 does not necessarily include the protrusion 128 or the slot 111 as shown in FIG. 4.

With reference to FIGS. 5-8, another fastener 202 can be used to couple the first workpiece 104A to the second workpiece 104B. The fastener 202 is similar to the fastener 102 described above. In the interest of brevity, only the features of the fastener 202 that are different from the features of the fastener 102 are discussed in detail below. The fastener 202 includes a first head 214 and a shank 216 extending from the first head 214. Like the fastener 102, the first head 214 defines a first or top head surface 222 and a second or bottom head surface 224 opposite the first head surface 222. The first head surface 222 may have a substantially flat shape or a dome shaped as shown. In addition, the first head 214 includes at least one side surface 223 interconnecting the first head surface 222 and the second head surface 224. The fastener 202 defines a head cavity 226 extending along the second head surface 224. The head cavity 226 is configured, shaped, and sized to receive softened or molten material from the first and second workpieces 104A, 104B.

The shank 216 defines a first shank end 218 and a second shank end 220 opposite the first shank end 218. As shown in FIG. 6, the shank 216 has a substantially triangular cross-section. This substantially triangular cross-section is defined by three flat surfaces 230 and three rounded corners 232 interconnecting the three flat surfaces 230. The three flat surfaces 230 allow softened or molten material from the first and second workpieces 104A, 104B to flow toward the head cavity 226 while the fastener 202 is rotating and advancing through the first and second workpieces 104A, 104B. The rounded corners 232 aid in softening the material forming the first and second workpieces 104A, 104B when the fastener 202 is advanced through the first and second workpieces 104A, 104B.

The shank 216 further includes a plurality of unconnected threaded portions 234 disposed along the shank 216. In the depicted embodiment, each threaded portion 234 extends from the second shank end 220 toward the first shank end 218. It is noted that the threaded portion 234 originates from the second shank end 220 and does not necessarily cover the whole shank length between the first and second shank ends 218 and 220. However, in the depicted embodiment, none of the threaded portions 234 extends along the entire perimeter of the shank 216. Each threaded portion 234 is disposed along one of the rounded corners 232 of the shank 216. Moreover, as shown in FIG. 8, the threads 236 in the threaded portions 234 are arranged at substantially the same level L (i.e., same height) in order to hinder the fastener 202 from being screwed out from the first and second workpieces 104A, 104B.

With reference FIGS. 9 and 10, another fastener 302 can be used to couple the first workpiece 104A to the second workpiece 104B. In the interest of brevity, only the features of the fastener 302 that are different from the features of the fastener 102 and the fastener 202 are discussed in detail below. The fastener 302 includes a head 314 and a shank 316 coupled to the head 314. The head 314 is coupled to the shank 316 at the first shank end 318. Further, the head 314 defines a head cavity 326 configured, shaped, and sized to receive softened or molten material from the first and second workpieces 104A, 104B. The fastener 302 also includes an anchor 315 coupled to the shank 316 at the second shank end 320. In the depicted embodiment, the anchor 315 has a substantially tapered or pointed shape. Irrespective of the shape, the anchor 315 is configured to traverse through the entire thickness of the first workpiece 104A and be embedded in the second workpiece 104B in order to couple the first and second workpieces 104A, 104B together.

The present disclosure also relates to a method of joining the first and second workpieces 104A, 104B using the fastener 302. First, the first workpiece 104A is moved relative to the second workpiece 104B in order to position the first workpiece 104A is at least partially over the second workpiece 104B as shown in FIG. 9. The fastener 302 is moved toward the first and second workpieces 104A, 104B in order to position it over the first workpiece 104A and the second workpiece 104B as shown in FIG. 9. At this juncture, the fastener axis F, which extends along the shank 316, should intersect the first workpiece 104A and the second workpiece 104B.

After positioning the fastener 302 over the first and second workpieces 104A, 104B, the fastener 302 is rotated about the fastener axis F in the direction indicated by arrow R. A motor or any suitable actuator can be used to rotate the fastener 302 about the fastener axis F. The fastener 302 is also moved linearly along the fastener axis F toward the first and second workpieces 104A, 104B while the fastener 302 rotates about the fastener axis F. Specifically, the fastener 302 is advanced in the direction indicated by arrow V toward the first workpiece 104A and the second workpiece 104B.

The fastener 302 is continuously advanced and rotated through the first and second workpieces 104A, 104B. Due to its rotation and linear movement through the first and second workpieces 104A, 104B, the fastener 302 increases the temperature of the first and second workpieces 104A, 104B, thereby softening (or even melting) the material of the first and second workpieces 104A, 104B disposed along the fastener axis F (i.e., the softened or molten material M). Accordingly, the rotation and translation of the fastener 302 increases the temperature of the first and second workpieces 104A, 104B at least beyond the softening temperature of the material forming first and second workpieces 104A, 104B. Through its continued linear advancement and rotation, the fastener 302 pierces the first and second workpieces 104A, 104B along the fastener axis F. Irrespective of the specific materials employed, the softening temperature of the material forming the fastener 302 is greater than the softening temperatures of the materials forming the first and second workpieces 104A, 104B in order to allow the fastener 302 to retain its rigidity while it rotates and passes through the first and second workpieces 104A, 104B.

The fastener 302 is continuously rotated and linearly advanced toward the second workpiece 104B along the fastener axis F until the anchor 315 is at least partially disposed inside the second workpiece 104B but before the anchor 315 is entirely disposed outside the second workpiece 104B. In other words, the fastener 302 is continously rotated and linearly advanced along the fastener axis F until the anchor 315 is at least partially disposed inside the second workpiece 104B but before the anchor 315 passes completely through the second workpiece 104B. In the depicted embodiment, the fastener 302 is continuously rotated and linearly advanced toward the second workpiece 104B until the anchor 315 is entirely disposed in the second workpiece 104 and no portion of the anchor 315 is disposed inside the first workpiece 104A. The softened material M of the first and second workpieces 104A, 104B around the shank 316 help secure the anchor 315 to the second workpiece 104A. Further, the softened material M is captured in the head cavity 326, thereby securing the fastener 302 to the first workpiece 104A.

Figure 11:
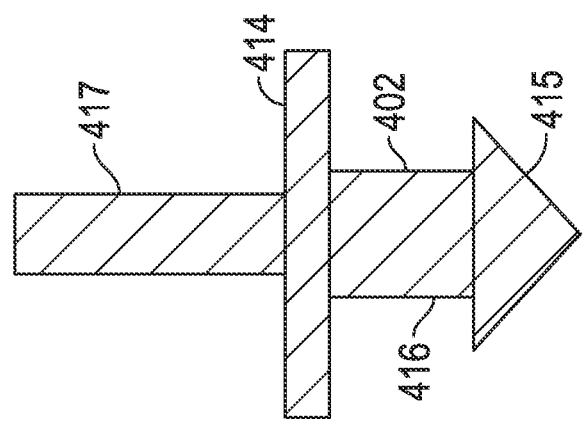
FIG. 11 is schematic, cross-sectional side view of a fastener in accordance with another embodiment of the present disclosure.

With reference to FIG. 11, another fastener 402 can be used to couple the first workpiece 104A to the second workpiece 104B. In the interest of brevity, only the features of the fastener 402 that are different from the features of the fasteners 102, 202, and 302 as discussed in detail below. The fastener 402 includes a head 414, a shank 416 coupled to the head 414, and an anchor 415 coupled to the shank 416. In addition, the fastener 402 includes a post 417 coupled to the head 414. The post 417 extends from the head 414 away from the shank 416 and may be wholly or partially made of a polymeric material, such as a carbon composite, or a metallic material. The post 417 can be configured as a stud and can be used to attach other objects to the fastener 402, such as electrical lines or other components. The post 417 may be molded to the head 414. The post 417 may be outside of the first and second workpieces 104A, 104B once the fastener 402 is coupled to the first and second workpieces 104A, 104B. The fastener 402 is often attached to one workpiece. Although it also can be used for joining at least two workpieces together, the fastener 402 can be used for affixing parts carried by the post to a workpiece. Any of the fasteners described in this disclosure may include the post 417.

With reference to FIG. 12, a tool assembly 500 can be used to help align the fastener 202 (or any other fastener) with the die 106. The tool assembly 500 includes a support 502, such as a robotic arm or a hand-held C-type tool, configured to hold and align the fastener 202 and an actuator 504 along a tool axis T. The actuator 504 may be a servo-motor and is configured to rotate the fastener 202 about the tool axis T. Further, the actuator 504 can linearly move the fastener 202 along the tool axis T toward and away from the open cavity 110 of the die 106. The tool axis T is substantially aligned with the die 106 and intersects the center C of the open cavity 110. It is useful to align the fastener 202 with the die 106 in order to maximize the efficacy of the fastener 202. The fastener 202 (or any other fastener) may be deemed part of the tool assembly 500. The tool assembly 500 may also be capable of heating the die 106 in order to facilitate forming the second head 125 (FIG. 2).

While the best modes for carrying out the teachings have been described in detail, those familiar with the art to which this disclosure relates will recognize various alternative designs and embodiments for practicing the teachings within the scope of the appended claims.

The invention claimed is:

1. A joining method, comprising:
    rotating a fastener about a fastener axis, wherein the fastener includes a first head and a shank extending from the first head along the fastener axis;
    moving the fastener toward a first workpiece and a second workpiece while the fastener rotates about the fastener axis such that the fastener increases a temperature in the first and second workpieces in order to soften and pierce the first and second workpieces along the fastener axis; and
    advancing the fastener through the first and second workpieces and toward an open cavity of a die after piercing the first and second workpieces while the fastener rotates about the fastener axis such that the shank is partially disposed inside the open cavity in order to form a second head; and
    wherein the first workpiece is made of a first material, the second workpiece is made of a second material, and the fastener is made of a third material, the first material has a first softening temperature, the second material has a second softening temperature, the third material has a third softening temperature, and the third softening temperature is greater than the first and second softening temperatures.

2. The joining method of claim 1, further comprising moving the first workpiece relative to the second workpiece such that the first workpiece is at least partially disposed over the second workpiece before moving the fastener toward the first and second workpiece.

3. The joining method of claim 2, further comprising moving the first and second workpieces toward a die such that the first and second workpieces are at least partially disposed over the die while the first workpiece remains at least partially disposed over the second workpiece.

4. The joining method of claim 1, wherein each of the first and second materials have a softening temperature ranging between 50 degrees Celsius and 330 degrees Celsius.

5. The joining method of claim 1, wherein each of the first and second materials is a carbon-fiber reinforced thermoplastic polymer.

6. The joining method of claim 5, wherein the third material is a polymeric material.

7. The joining method of claim 1, wherein the die is made of a fourth material, and the fourth material has a melting temperature that is greater than 400 degrees Celsius.

8. The joining method of claim 1, wherein each of the first and second materials is a magnesium alloy.

9. The joining method of claim 8, wherein the third material is an aluminum alloy.

10. The joining method of claim 1, wherein the open cavity has a concave shape.

11. The joining method of claim 10, wherein the die includes a die body and a protrusion extending from the die body through a center of the open cavity.

12. The joining method of claim 11, wherein the protrusion has a pointed shape.

13. The joining method of claim 10, wherein the die defines a slot in communication with the open cavity, wherein the slot is disposed along a center of the open cavity.

14. The joining method of claim 1, wherein the fastener includes a plurality of unconnected threaded portions disposed along the shank.

15. The joining method of claim 14, wherein the shank has a substantially triangular cross-section, the triangular cross-section defining three flat surfaces and three rounded corners interconnecting the three flat surfaces.

16. The joining method of claim 15, wherein the unconnected threaded portions are disposed along the three rounded corners.

17. The joining method of claim 16, wherein each of the unconnected threaded portions includes threads disposed along a same height with respect to each other.

18. A method, comprising:
    rotating a fastener about a fastener axis, wherein the fastener is made of a polymer and includes a head and a shank extending from the head along the fastener axis, wherein the shank defines a first shank end and a second shank end opposite the first shank end, the head is coupled to the shank at the first shank end, the fastener includes an anchor coupled to the shank at the second shank end, and the anchor has a tapered shape;
    advancing the fastener through a first workpiece and into a second workpiece while the fastener rotates about the fastener axis such that the fastener increases a temperature in the first and second workpieces in order to soften and pierce the first and second workpieces; and
    continuing rotating and advancing the fastener toward the second workpiece along the fastener axis until the anchor is at least partially disposed inside the second workpiece but before the anchor passes completely through the second workpiece.

* * * * *